United States Patent [19]

Slack et al.

[11] Patent Number: 5,667,242
[45] Date of Patent: Sep. 16, 1997

[54] FRAME MEMBER FOR A SEAT MOUNTED VEHICLE SAFETY APPARATUS

[75] Inventors: Timothy D. Slack, Troy; William R. Buchanan, Romeo, both of Mich.

[73] Assignee: TRW Vehicle Safety Systems Inc., Lyndhurst, Ohio

[21] Appl. No.: 544,015

[22] Filed: Oct. 17, 1995

[51] Int. Cl.⁶ ................................................ B60R 21/22
[52] U.S. Cl. .......................... 280/730.2; 280/728.2; 280/728.3
[58] Field of Search ...................... 280/730.2, 730.1, 280/728.3, 728.1, 728.2

[56] References Cited

U.S. PATENT DOCUMENTS 5,393,090  2/1995  Sheperd et al. .................. 280/728.2
5,498,030  3/1996  Hill et al. ........................ 280/730.2
5,503,428  4/1996  Awotwi et al. ................... 280/730.2

*Primary Examiner*—Eric D. Culbreth
*Attorney, Agent, or Firm*—Tarolli, Sundheim, Covell, Tummino & Covell

[57] ABSTRACT

A vehicle safety apparatus (10) includes a seat (12) having a frame (20). A cushion (24) is supported by the frame (20) and is surrounded by a seat cover (32). The seat cover (32) has a first opening (36). The cushion (24) has a chamber (28). An air bag module (40) having an air bag (60) and a module deployment door (78) is disposed within the chamber (28). A frame member (100) having a second opening (116) is fastened to the air bag module (40). The frame member (100) clamps the seat cover (32) and the module deployment door (78) together. The air bag (60), when inflated, inflates through the first and second openings (36) and (116).

12 Claims, 3 Drawing Sheets

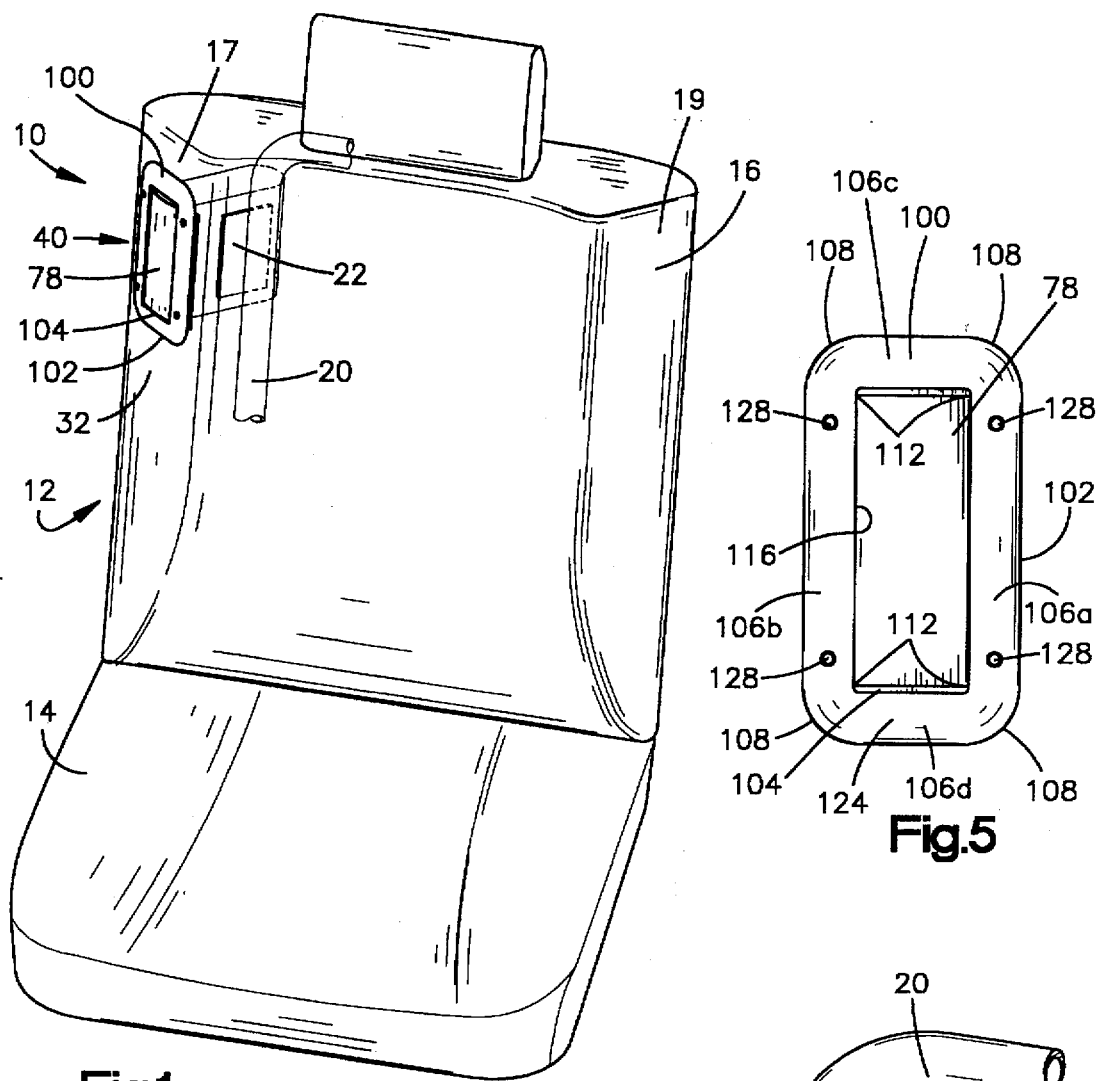
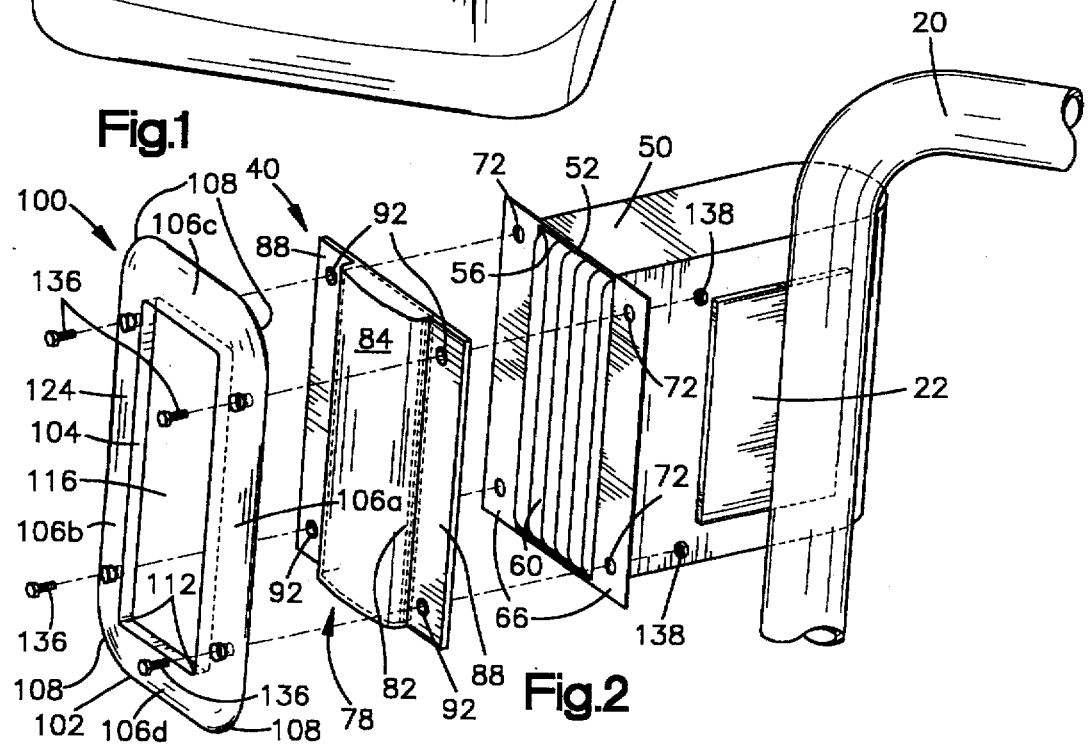

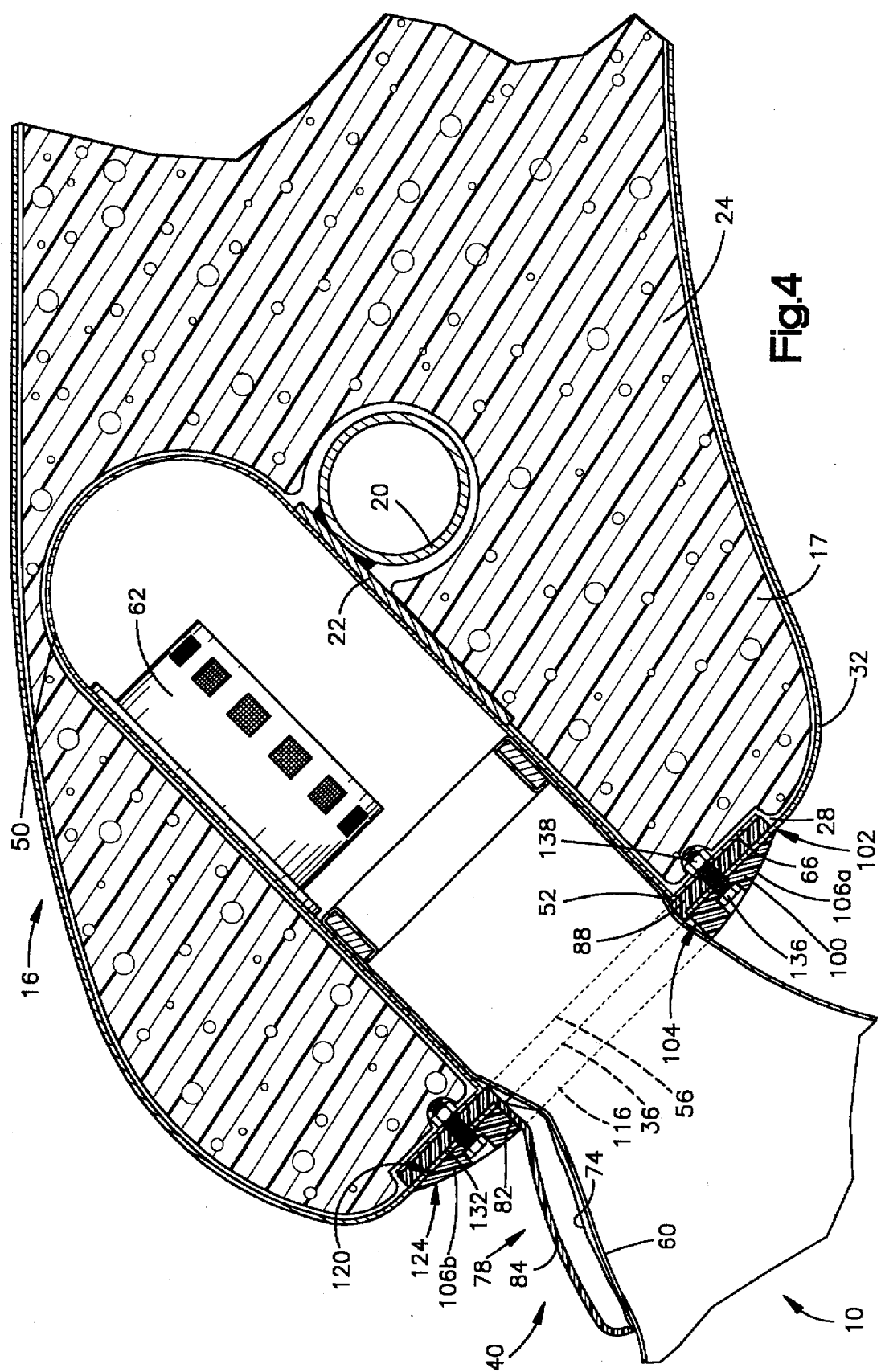

FRAME MEMBER FOR A SEAT MOUNTED VEHICLE SAFETY APPARATUS

TECHNICAL FIELD

The present invention relates to a vehicle occupant safety apparatus, and particularly relates to a seat mounted apparatus for protecting a vehicle occupant in the event of a collision.

BACKGROUND OF THE INVENTION

A typical vehicle seat mounted safety apparatus for protecting a vehicle occupant in the event of a collision includes an air bag module mounted in a chamber in a vehicle seat. A typical air bag module includes a deployment door or cover. A typical vehicle seat includes a frame, a cushion, and a seat cover surrounding the cushion. It is desirable when housing an air bag module in a seat to have a tight, attractive fit between the air bag module deployment door and the seat cover.

SUMMARY OF THE INVENTION

The present invention resides in a seat mounted apparatus for protecting a vehicle occupant in the event of a collision. The seat has a frame, a cushion supported by the frame, a chamber within the cushion and a seat cover surrounding the cushion. The seat cover has a first opening communicating with the chamber.

An air bag module is disposed within the chamber and is connected to the frame. The air bag module includes an air bag which is inflatable through the first opening. The air bag module has a module deployment door covering the first opening. The seat mounted apparatus has a frame member having a second opening. The frame member is fastened to the air bag module. The frame member clamps the seat cover and the module deployment door together. The air bag, when inflated, is inflated through the second opening.

BRIEF DESCRIPTION OF THE DRAWINGS

Further features of the present invention will become apparent to those skilled in the art to which the present invention relates from reading the following specification with reference to the accompanying drawings, in which:

FIG. 1 is a perspective view of a vehicle seat having a safety apparatus in accordance with the present invention;

FIG. 2 is an enlarged exploded view of the safety apparatus illustrated in FIG. 1;

FIG. 4 is a view similar to FIG. 3 showing parts in a different position;

FIG. 5 is a front elevational view of part of the vehicle safety apparatus shown in FIG. 1.

DESCRIPTION OF PREFERRED EMBODIMENT

Figure 3:
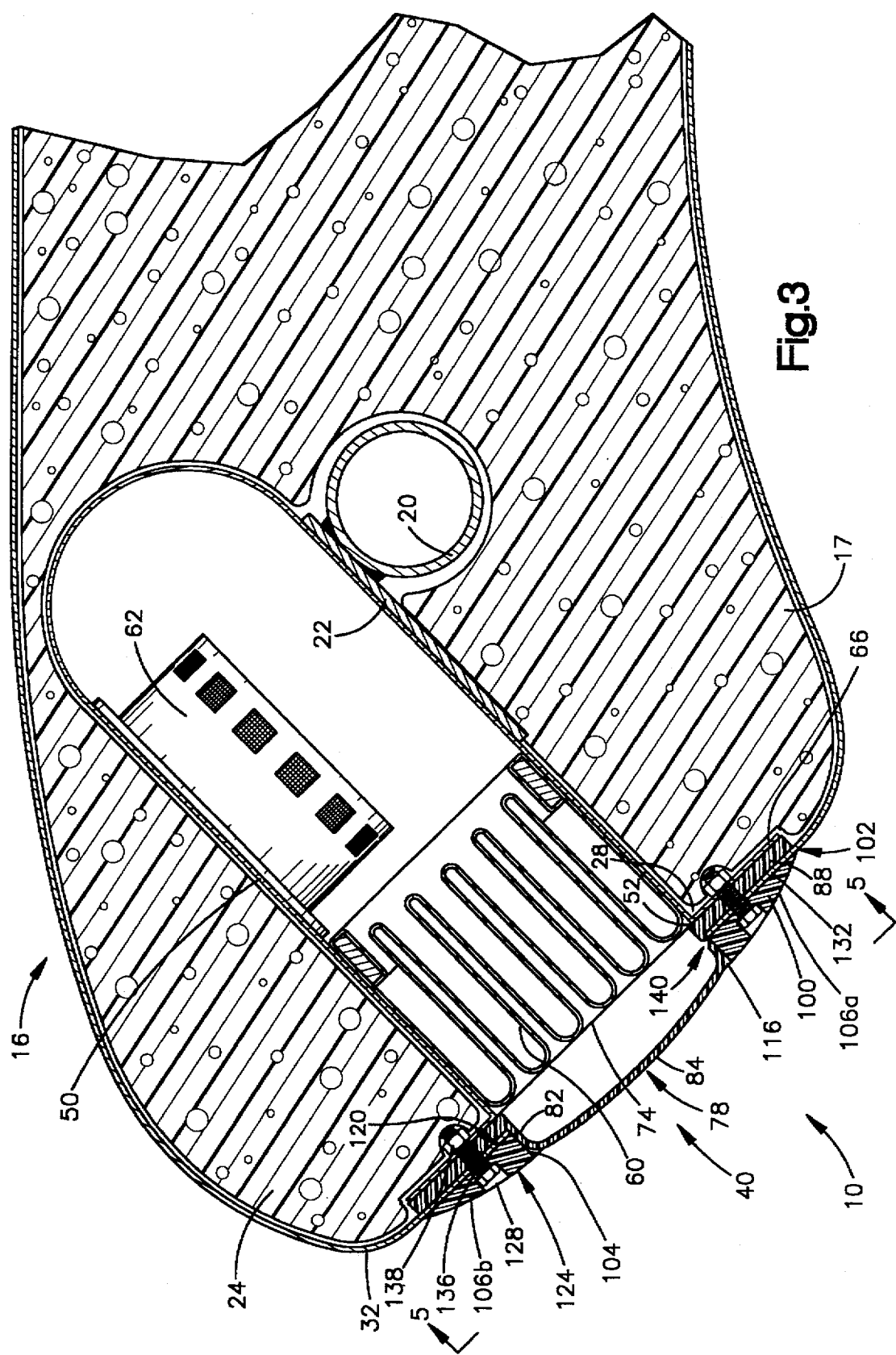
FIG. 3 is a schematic sectional view of a portion of the vehicle seat and the vehicle safety apparatus of FIG. 1.

The present invention relates to a vehicle safety apparatus 10 (FIG. 1) which is used with a seat 12 for an occupant of a vehicle. The seat 12 includes a seat bottom cushion 14 affixed to the vehicle (not shown). The seat 12 further includes a seat back 16 connected with the seat bottom cushion 14. The seat back has a right, or an outboard side portion 17 and a left, or an inboard side portion 19.

Disposed within the interior of the seat back 16 is a frame 20. A cushion 24 (FIG. 3) surrounds and is supported and is by the frame 20. The cushion 24 is preferably made of polyurethane but could be made of any suitable cushion material.

The upper portion of the cushion 24 at the outboard side portion 17 has a generally rectangular chamber 28. A seat cover 32, preferably made of a layer of leather or cloth, surrounds the cushion 24 and has a first opening 36 (FIG. 4). The first opening 36 is also generally rectangular in shape and communicates with the chamber 28.

An air bag module 40 (FIG. 2) is disposed within the chamber 28 (FIG. 3) and is connected to a base plate 22, which is connected to the frame 20. The module 40 is connected to the base plate 22 by conventional securing means. The air bag module 40 includes a reaction can 50 (FIG. 2). The reaction can 50 has a rim portion 52 defining a generally rectangular-shaped second opening 56 (FIG. 4). The reaction can 50 (FIG. 3) is large enough to house an uninflated air bag 60 and an inflator 62 for supplying inflation fluid to the air bag. However, the reaction can 50 is also small enough to be housed within the chamber 28.

Disposed on opposing sides of the second opening 56 and extending from opposing sides of the rim portion 52 of the reaction can 50 are two can flanges 66, as can best be seen in FIG. 2. The can flanges 66 are generally rectangular in shape and are substantially the same length as the second opening 56. Each of the can flanges 66 contain two spaced apart can flange openings 72.

The air bag module 40 further includes a module deployment door 78. The module deployment door 78 is generally rectangular in shape and is of sufficient size to cover the second opening 56, the rim portion 52 and the can flanges 66 of the reaction can 50. The module deployment door 78 has two parallel and spaced apart side walls 82 and a raised door portion 84 extending between and connecting the side walls. Two door flanges 88 are disposed on opposing sides of the door portion 84. Each of the door flanges 88 extends outward from a respective side wall 82 essentially parallel to the raised door portion 84. The door flanges 88 generally correspond in shape to the can flanges 66 of the reaction can 50 and contain two door flange openings 92 which substantially align with the can flange openings 72.

A one-piece frame member 100 is fastened to the air bag module 40. It should be understood, that the frame member 100 could also be made of multiple pieces. The frame member 100 is generally rectangular in shape and is defined by an outer edge portion 102 and an inner edge portion 104. The outer edge portion 102 and the inner edge portion 104 cooperate to define four sides 106a–d (FIG. 5) which comprise the frame member 100. The frame member 100 has a longitudinally extending first side 106a, a longitudinally extending second side 106b, a transversely extending third side 106c and a transversely extending fourth side 106d. The first and second sides 106a and 106b are parallel to each other. The third and fourth sides 106c and 106d are parallel to each other and also extend between and connect the first and second sides 106a and 106b.

The outer edge portion 102 is generally rectangular in shape with four identical rounded corners 108 as can best be seen in FIG. 5. The inner edge portion 104, also generally rectangular in shape, defines four identical essentially right angled corners 112. The inner edge portion 104 defines a third opening 116 (FIG. 4). The third opening 116 is also generally rectangular in shape.

The frame member 100 is preferably made of metal or plastic. The one-piece frame member 100 has a substantially flat planar base surface 120 and a generally rounded upper surface 124. Since the frame member 100 has a rounded upper surface 124 and a flat base surface 120, the thickness of the frame member varies. The frame member 100 is thickest near the inner edge portion 104, and decreases in thickness as it extends toward the outer edge portion 102 of the frame member. The frame member 100 has four spaced apart openings 128 (FIG. 5) which corresponds to and align with the can flange openings 72 and the door flange openings 92.

To assemble the vehicle safety apparatus 10, the inflator 62 and the uninflated air bag 60 are first secured to the interior of the reaction can 50. The module deployment door 78 is then placed over the second opening 56 (FIG. 4) of the reaction can 50 so that the door flange openings 92 substantially align with the can flange openings 72. Then the door flanges 88 of module deployment door 78 are attached to the can flanges 66 by conventional means (not shown), forming the air bag module 40.

The air bag module 40 is inserted into the chamber 28 (FIG. 3) of the cushion 24. The reaction can 50 (FIG. 2) is attached to the seat frame 20 by means of attachment to the base plate 22. A portion 132 of the seat cover 32 (FIG. 3) is placed over the door flanges 88.

The frame member 100 is then placed over the seat cover 32 so that the raised door portion 84 of the module deployment door 78 extends through the third opening 116 of the frame member. More specifically, the frame member 100 is placed over the portion 132 of the seat cover 32 which is placed over the door flanges 88. All of the openings 72, 92, and 128 are aligned and bolts 136 are inserted through the openings 72, 92 and 128. Each of the bolts 136 is fastened and held in place by a corresponding nut 138. The nuts 138 are attached to the interior surface of a respective can flange 66 by welding or other conventional means.

The frame member 100 is thus fastened to the air bag module 40 so that it clamps the seat cover 32 and the module deployment door 78 together. Specifically, the portion 132 of the seat cover 32 placed over the door flanges 88 is sandwiched between the base surface 120 of the frame member 100 and the door flanges of the module deployment door 78. Moreover, the inner edge portion 104 of the frame member 100 abuts the side walls 82 of the module deployment door 78 when the frame member is fastened to the air bag module 40.

In this arrangement, the frame member 100 seals off the first opening 36 in the seat cover 32 to prevent access to or tampering with the air bag module 40 and assures a reliable seal between the seat cover and the raised door portion 84 of the module deployment door 78. Thus, the frame member 100 provides for a tight, attractive fit between the frame member and the seat cover 32 and between the frame member and the raised door portion 84 of the module deployment door 78.

Upon the occurrence of an event indicating a vehicle collision, such as rapid deceleration, an electrical signal is communicated to the inflator 62. The inflator 62 then releases inflation fluid which rapidly inflates the air bag 60. As the inflation fluid fills the air bag 60, the pressure of the air bag increases and exerts an increasing pressure on the interior side of the module deployment door 78. Once the pressure being exerted on the interior side of the module deployment door 78 reaches a predetermined level, a weakened portion 140 (FIG. 3) of the deployment door is ruptured. Once the weakened portion 140 ruptures, the raised door portion 84 of the deployment door 78 (FIG. 4) is directed towards the outboard side portion 17 of the seat back 16 as the air bag 60 is directed to expand through the first, second and third openings 36, 56 and 116 to protect a vehicle occupant. Thus, the deploying air bag 60 inflates from the outboard side portion 17 of the seat 12 to protect the head of the vehicle occupant from forcibly striking parts of the vehicle in the event of a collision. The frame member 100 is held in place by means of the bolts 136 and nuts 138 during inflation of the air bag.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for protecting a vehicle occupant comprising:

a seat having a frame;

a cushion supported by said frame;

a chamber within said cushion;

a seat cover surrounding said cushion and having a first opening communicating with said chamber;

an air bag module disposed within said chamber and connected to said frame, said air bag module including an air bag which is inflatable through said first opening, said air bag module having a module deployment door covering said first opening; and a frame member having a second opening, said frame member being fastened to said air bag module, said frame member clamping said seat cover and said module deployment door together, and said air bag when inflated being inflated through said second opening.

2. Apparatus as defined in claim 1 wherein said frame member has a generally rectangular shape.

3. Apparatus as defined in claim 1 wherein said frame member has an outer edge portion and an inner edge portion.

4. Apparatus as defined in claim 3 wherein said inner edge portion defines said second opening.

5. Apparatus as defined in claim 4 wherein said inner edge portion is generally rectangular.

6. Apparatus as defined in claim 1 wherein said frame member has a substantially planar base surface and a generally rounded upper surface.

7. Apparatus as defined in claim 6 wherein said generally rounded upper surface is such that said frame member has a varying thickness.

8. Apparatus as defined in claim 7 wherein said frame member has an outer edge portion and an inner edge portion, said frame member being thickest near said inner edge portion and decreasing in thickness as it extends towards said outer edge portion.

9. Apparatus as defined in claim 1 wherein said frame member is formed in one piece.

10. Apparatus as defined in claim 1 wherein said frame member has a longitudinal extending first side, a longitudinally extending second side, a transversely extending third side and a transversely extending fourth side.

11. Apparatus as defined in claim 10 where said fist and second sides are parallel with respect to each other and said third and fourth sides are parallel with respect to each other.

12. Apparatus as defined in claim 11 wherein said third and fourth sides extend between and connect said first and second sides.

* * * * *